United States Patent Office 3,121,713
Patented Feb. 18, 1964

3,121,713
NEW METALLISED AZO DYESTUFFS
Alexander Blackhall, Frank Hall, and George Harold Keats, all of Manchester, England, assignors to Imperial Chemical Industries Limited, Millbank, London, England, a corporation of Great Britain
No Drawing. Filed June 27, 1960, Ser. No. 38,748
Claims priority, application Great Britain July 13, 1959
2 Claims. (Cl. 260—151)

This invention relates to new azo dyestuffs and more particularly it relates to new metallised azo dyestuffs which are valuable for colouring wool and polyamide textile materials.

According to the invention there are provided the new metallised azo dyestuffs, which in the form of the free acids, are represented by the formula:

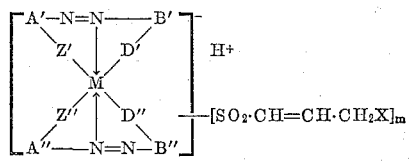

wherein A′ and A″ each represent substituted or unsubstituted arylene radicals and may be the same or different, B′ and B″ each represent the residues of substituted or unsubstituted coupling components which couple in the ortho or vicinal positions to D′ and D″ respectively and B′ and B″ may be the same or different, Z′ and Z″ each represent —O— or —COO— and may be the same or different, D′ and D″ each represent —O—, —NH— or —N-alkyl- and may be the same or different, M represents a chromium or cobalt atom, X represents a halogen atom or a hydroxy group and $m$ represents 1, 2, 3 or 4, provided that each of the groups $SO_2CH=CH.CH_2X$ is attached directly to a carbon atom present in A′, A″, B′ or B″ and that A′, A″, B′ and B″ are free from sulphonic and carboxylic acid groups.

As examples of the unsubstituted arylene radicals represented by A′ and A″ there may be mentioned phenylene and naphthylene and as examples of substituents which may be present in these arylene radicals and which may also be present in the residues of the coupling components represented by B′ and B″ there may be mentioned alkyl for example methyl, alkoxy for example methoxy, chlorine, bromine, nitro, alkylsulphonyl for example methylsulphonyl and ethylsulphonyl, acylamino for example acetylamino, benzoylamino, carbomethoxyamino and carbethoxyamino, sulphamyl, N-substituted sulphamyl for example N:N-dimethylsulphamyl, N-ethylsulphamyl, N-benzoylsulphamyl and N-phenylsulphamyl.

The residues of the coupling components represented by B′ and B″ may by the residues of any coupling components which couple in an ortho or vicinal position to the metallisable groups —D′H and D″H respectively, wherein D′ and D″ have the means stated above, but B′ and B″ are preferably the residues of coupling components of the phenol, naphthol, aceto-acetarylide and 5-pyrazolone series.

As examples of the halogen atoms represented by X there may be mentioned chlorine and bromine.

According to a further feature of the invention there is provided a process for the manufacture of the new metallised azo dyestuffs, as hereinbefore defined, which comprises treating 1 or 2 different metallisable azo compounds of the formula:

$$A-N=N-B$$
$$\underset{T}{|} \quad \underset{DH}{|}$$

wherein A represents a substituted or unsubstituted arylene radical, B represents the residue of a coupling component which couples in the ortho or vicinal position to D, D represents —O—, —NH— or —N-alkyl- and T represents a hydroxy, carboxy or alkoxy group which is attached to A in the ortho position to the azo link, with an agent or agents yielding chromium or cobalt, the metallisable azo compound or compounds being so chosen that the resulting metallised azo dyestuff contains 1, 2, 3 or 4 groups of the formula: $—SO_2CH=CH.CH_2X$, wherein X has the meaning stated above, and is free from sulphonic and carboxylic acid groups.

The treatment of the metallisable azo compound or compounds with the agent or agents yielding chromium or cobalt is carried out under mildly acid, neutral or alkaline conditions, the amount of the agent or agents yielding chromium or cobalt being such that corresponds to more than 0.5 atomic proportions, and preferably not more than 1.5 atomic proportions, of chromium or cobalt for each molecular proportion of the said metallisable azo compound or compounds.

As examples of the agents yielding chromium or cobalt which may be used in the alternative process of the invention there may be mentioned chromium or cobalt halides, for example the chlorides or fluorides, chromium or cobalt salts of aliphatic carboxylic acids, for example formic or acetic acid and mixtures of chromium or cobalt salts with alkali metal salts of aliphatic hydroxycarboxylic acids, for example of tartaric acid, and chromium complexes of aromatic orthohydroxy carboxylic acids, for example salicylic acid.

The treatment of the said metallisable azo compound or compounds with the agent or agents yielding chromium or cobalt is carried out under mildly acid, neutral or alkaline conditions. The treatment may be conveniently carried out at elevated temperature under atmospheric pressure in aqueous medium preferably in the presence of an organic liquid, for example ethyl alcohol, n-butyl alcohol, β-ethoxyethanol, ethylene glycol or acetic acid. The formation of the metal complex may be facilitated by adding a wetting or dispersing agent to the reaction mixture. Upon completion of the reaction the metallised azo dyestuff is separated and, if desired in the case of those metallised azo dyestuffs which are soluble in water, may be purified by reprecipitating it, in the form of a salt from an aqueous alkaline solution, for example an aqueous solution rendered alkaline by the addition of sodium carbonate, sodium hydroxide, sodium phosphate or ammonium hydroxide.

The metallisable azo compounds used in the process of the invention may be obtained by diazotising an amine of the formula:

$$A-NH_2$$
$$\underset{T}{|}$$

wherein A and T have the meanings stated above and T is in the ortho position to the —$NH_2$ group and coupling the diazo compounds with a coupling component of the formula:

$$B-H$$
$$\underset{DH}{|}$$

which couples in the ortho or vicinal position to the metallisable group —DH, the amine and coupling component being so chosen that the resulting metallisable azo compounds each contain 0, 1 or 2 groups of the formula: $—SO_2.CH=CHCH_2X$, wherein X has the meaning stated above, and are free from sulphonic and carboxylic acid groups, other than a carboxylic acid group represented by T.

As examples of amines which may be used to obtain the metallisable azo compounds used in the process of the invention there may be mentioned o-aminophenol,
4-chloro-2-aminophenol,
6-chloro-2-aminophenol,
4-, 5- or 6-nitro-2-aminophenol,
4:6-dinitro-2-aminophenol,
4-chloro-5-nitro-2-aminophenol,
2-aminophenol-4-sulphonamide,
2-aminophenol-4-sulphon-N-β-hydroxyethylamide,
2-aminophenol-4-sulphondimethylamide,
2-aminophenol-4-sulphonanilide,
2-aminophenol-4-methylsulphone,
2-aminophenol-4-ethylsulphone,
2-aminophenol-4-β-hydroxyethylsulphone,
anthranilic acid,
4-chloroanthranilic acid,
5-nitroanthranilic acid,
4-sulphamylanthranilic acid,
4-methylsulphonylanthranilic acid,
4-methoxy-2-aminophenol,
4-methyl-2-aminophenol,
2-aminophenol-4-suphonmorpholide,
o-anisidine,
4-, 5- or 6-nitro-2-anisidine,
4-, 5- or 6-chloro-2-anisidine,
2-amino-4-(3'-hydroxyprop-1':2'-enylsulphonyl)anisole,
2-amino-4-(3'-chloroprop-1':2'-enylsulphonyl)anisole,
4- or 5-(3'-chloroprop-1':2'-enylsulphonyl)anthranilic acid,
4- or 5-(3' - hydroxyprop-1':2'-enylsulphonyl)anthranilic acid,
4-(3'-hydroxyprop-1':2'-enylsulphonyl)-2:5-dimethoxyaniline and
4-(3'-chloroprop-1':2'-enylsulphonyl)-5-methyl-2-methoxyaniline.

Those amines of the formula:

as hereinbefore defined, which also contain 1 or 2 groups of the formula: —SO₂.CH=CH.CH₂X wherein X represents a hydroxy group may be obtained by treating the corresponding amine, or the N-acetyl derivative thereof, containing 1 or 2 sulphinic acid groups with an epihalogenohydrin in the presence of caustic alkali and subsequently removing the N-acetyl group when present by an acid hydrolysis.

Those amines of the formula:

as hereinbefore defined, which also contain one or two groups of the formula: —SO₂.CH=CH.CH₂X wherein X represents a halogen atom may be obtained by reacting the N-acetyl derivative of the corresponding amine containing 1 or 2 groups of the formula:

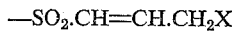
—SO₂.CH=CH.CH₂X wherein X represents a hydroxy group, with a halogenating agent such as phosphorus pentachloride or phosphorus pentabromide and subsequently removing the N-acetyl group by an acid hydrolysis.

As examples of coupling components which may be used to obtain the metallisable azo compounds used in the process of the invention there may be mentioned 5-pyrazolones such as 1:3-dimethyl-5-pyrazolone,
1-phenyl-3-methyl-5-pyrazolone,
1-phenyl-3-carboethoxy-5-pyrazolone,
1-(2'-, 3'- or 4'-methylphenyl)-3-methyl-5-pyrazolone,
3-methyl-5-pyrazolone,
1-(2'-, 3'- or 4'-chlorophenyl)-3-methyl-5-pyrazolone,
1-(3'- or 4'-sulphamylphenyl)-3-methyl-5-pyrazolone,
1-(3'- or 4'-N-β-hydroxyethylsulphamylphenyl)-3-methyl-5-pyrazolone,
1-(2'-, 3'- or 4'-nitrophenyl)-3-methyl-5-pyrazolone,
1-(2'-, 3'- or 4'-β-hydroxyethylsulphonylphenyl)-3-methyl-5-pyrazolone,
1-[3'-(3''-hydroxyprop-1'':2''-enylsulphonyl)phenyl]-3-methyl-5-pyrazolone,
1-[4'-(3''-hydroxyprop-1'':2''-enylsulphonyl)phenyl]-3-methyl-5-pyrazolone,
1-[3'-(3''-chloroprop-1'':2''-enylsulphonyl)phenyl]-3-methyl-5-pyrazolone and
1-[4'-(3''-chloroprop-1'':2''-enylsulphonyl)phenyl]-3-methyl-5-pyrazolone,
naphthols such as
1-acetylamino-7-naphthol,
1-propionylamino-7-naphthol,
1-benzenesulphonylamino-7-naphthol,
1-carbomethoxyamino-7-naphthol,
1-carboethoxyamino-7-naphthol,
2-naphthol,
2-naphthol-6-sulphon-N-β-hydroxyethylamide,
2-naphthol-6-β-hydroxyethylsulphone,
2-naphthol-6-sulphonanilide,
2-naphthol-6-sulphon-n-(4'-N-β-hydroxyethylsulphamylphenyl)amide,
6-acetyl-2-naphthol,
1-naphthol-3-sulphonamide,
2-naphthol-6-sulphonamide,
1-naphthol-5-sulphonamide,
4-acetyl-1-naphthol,
5:8-dichloro-1-naphthol,
5-chloro-1-naphthol,
6-(3'-hydroxyprop-1':2'-enylsulphonyl)-2-naphthol and
6-(3'-chloroprop-1':2'-enylsulphonyl)-2-naphthol,
acylacetoacetarylides such as
acetoacetanilide,
3- and 4-(3'-hydroxyprop-1':2'-enylsulphonyl)acetoacetanilide and
3- and 4-(3'-chloroprop-1':2'-enylsulphonyl)acetoacetanilide,
phenols such as
3:4-dimethylphenol,
p-cresol,
2- or 3-acetylamino-4-methylphenol,
2-hydroxy-5:6:7:8-tetrahydronaphthalene and 2-hydroxy-3-sulphamyl-5:6:7:8-tetrahydronaphthalene,
2:4-dihydroxyquinoline, and coupling components which couple in ortho position to an amino group such as 2-naphthylamine and 2-naphthylamine-6-sulphonamide.

Those coupling components of the formula:

as hereinbefore defined, which also contain 1 or 2 groups of the formula: —SO₂.CH=CH.CH₂X wherein X represents a halogen atom or a hydroxy group and —B—DH represents the residue of an acetoacetarylide, may be obtained by reacting with diketene the corresponding amine containing 1 or 2 groups of the formula

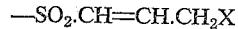
—SO₂.CH=CH.CH₂X wherein X represents a halogen atom or a hydroxy group.

Those coupling components of the formula:

as hereinbefore defined, which also contain 1 or 2 groups of the formula: —SO₂.CH=CH.CH₂X wherein X represents a halogen atom or a hydroxy group and —B—DH represents the residue of a 5-pyrazolone, may be obtained by diazotising the corresponding amine containing 1 or 2 groups of the formula: —SO₂.CH=CH.CH₂X wherein X represents a halogen atom or a hydroxy group, treating the diazo compound so obtained with a mixture of sodium sulphite and sodium hydroxide, condensing the hydrazine so obtained with an acylacetic ester such as acetoacetic ester and finally ring closing to form the 5-pyrazolone.

Those coupling components of the formula:

as hereinbefore defined, which also contain 1 or 2 groups of the formula: —SO₂.CH=CH.CH₂X wherein X represents a hydroxy group and —B—DH represents the residue of a naphthol may be obtained by acetylating the corresponding naphthylamine mono- or disulphonic acid, converting to the acid chloride, reducing to the corresponding mono- or disulphinic acid, condensing with an epihalogenohydrin in the presence of an alkali, hydrolysing off the N-acetyl group, and finally converting the amino group to a hydroxy group by diazotising and heating an aqueous solution or suspension of the resulting diazo compound.

Those coupling components of the formula:

as hereinbefore defined, which also contain 1 or 2 groups of the formula: —SO₂.CH=CH.CH₂X wherein X represents a halogen atom and B—DH represents the residue of a naphthol, may be obtained by acetylating the corresponding naphthol containing 1 or 2 groups of the formula: —SO₂.CH=CH.CH₂X wherein X represents a hydroxy group, treating with a halogenating agent such as phosphorus pentachloride or phosphorus pentabromide and subsequently hydrolysing off the acetyl group.

A preferred class of the new metallised azo dyestuffs of the invention are the dyestuffs which, in the form of the free acids, are represented by the formula:

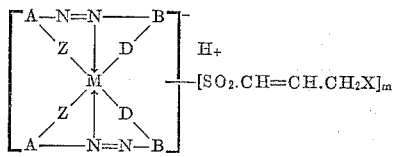

wherein A represents a substituted or unsubstituted arylene radical, B represents the residue of a substituted or unsubstituted coupling component which couples in ortho or vicinal position to D, Z represents —O— or —COO—, D represents —O—, —NH— or

and M, m and X have the meanings stated above, provided that A and B are free from sulphonic and carboxylic acid groups.

In this preferred class m preferably represents 2 or 4 and D preferably represents —O—.

The new metallised azo dyestuffs, as hereinbefore defined, can be applied to natural and regenerated protein fibres, for example wool and silk, and to polyamide and polyurethane fibres from an aqueous neutral or slightly acid dyebath. In those cases where the metallised azo dyestuffs are insoluble or only slightly soluble in water it is preferred to use the metallised azo dyestuffs in a dispersed form, which may be obtained by milling the said dyestuffs in the presence of a suitable dispersing agent.

The new metallised azo dyestuffs, as hereinbefore defined, have excellent affinity for the said fibres and the dyeings so obtained have excellent fastness to light and to wet treatments such as washing, milling, potting and acid cross dyeing.

The invention is illustrated but not limited by the following examples in which the parts and percentages are by weight.

*Example 1*

A solution of 7 parts of sodium nitrite in 50 parts of water is added with stirring to a mixture of 24.3 parts of 2 - amino - 4 - (3'-hydroxyprop-1':2'-enylsulphonyl)-anisole, 300 parts of ice, 34.8 parts of a 10 N aqueous solution of hydrochloric acid and 200 parts of water. The mixture is then stirred for a further 10 minutes and the solution so obtained is added during 15 minutes to a solution 23.4 parts of 2-naphthol-6-sulphonamide and 8 parts of sodium hydroxide in 1200 parts of water, the temperature of the mixture being maintained below 5° C. by external cooling. The mixture is then stirred for 1 hours and the precipitated monoazo compound is filtered off, washed with 50 parts of water and dried.

A mixture of 28 parts of the above monoazo compound, 16 parts of chromium triacetate and 1330 parts of ethylene glycol is stirred for 8 hours at a temperature between 130° and 135° C. The mixture is then cooled to 20° C. and added to a solution of 320 parts of sodium chloride in 4400 parts of water. The precipitated dyestuff is then filtered off and washed with a 10% aqueous solution of sodium chloride. The dyestuff so obtained is then purified by dissolving it in 2400 parts of water by the addition of sodium carbonate, the solution so obtained is filtered, 60 parts of sodium chloride are added to the filtrate and the precipitated dyestuff is filtered off and dried.

When applied to wool from a neutral or slightly acid dyebath the dyestuff yields violet shades possessing excellent fastness to wet treatments.

The 2 - amino-4-(3'-hydroxyprop-1':2'-enylsulphonyl)-anisole used in the above example may be obtained as follows:

A mixture of 246 parts of o-anisidine, 144 parts of acetic acid and 220 parts of acetic anhydride is stirred at a temperature between 50° and 60° C. for 1 hour. The solution is then cooled to 25° C. and 1864 parts of chlorosulphonic acid are added during 2½ hours, the temperature of the mixture being maintained between 30° and 40° C. by external cooling. The mixture is stirred for 30 minutes at 40° C. and then poured into a mixture of 2000 parts of water and 4000 parts of ice. The precipitated 2-acetylaminoanisole-4-sulphonchloride is then filtered off and washed with ice-cold water.

The sulphonchloride so obtained is added during 1 hour with stirring to a solution of 310 parts of sodium sulphite in 1550 parts of water, the resulting mixture being maintained alkaline to phenophthalein by the simultaneous addition of a 35% aqueous solution of sodium hydroxide. The mixture is then stirred for 15 hours at 20° C., 2000 parts of water and 10 parts of active carbon are added, the mixture is filtered and the filtrate is acidified to Congo red with a concentrated aqueous solution of hydrochloric acid. The precipitated 2-acetylamino-anisole-4-sulphinic acid is then filtered off, washed with water and dried.

A mixture of 91.6 parts of the above sulphinic acid, 16.5 parts of sodium hydroxide, 44.4 parts of epichlorhydrin and 500 parts of water is stirred for 48 hours at 20° C. The precipitated 2-acetylamino-4-(3'-hydroxyprop-1':2'-enylsulphonyl) - anisole is then filtered off, washed with water and dried.

A mixture of 60 parts of the above compound and 500 parts of a 2 N aqueous solution of sulphuric acid is heated for 30 minutes at a temperature between 95 and 100° C. The mixture is then filtered and the filtrate treated with sodium bicarbonate until the mixture is neutral to litmus. The precipitated product is then filtered off and dried. The 2-amino-4-(3'-hydroxyprop-1':2'-enylsulphonyl)anisole so obtained melts between 115° C. and 117° C.

*Example 2*

A mixture of 3.98 parts of the monoazo compound obtained by coupling diazotised 2-amino-4-(3'-hydroxyprop-1':2'-enylsulphonyl)-anisole with 2-naphthol in alkaline medium, 2.11 parts of chromium acetate, 170 parts of ethylene glycol and 30 parts of water is stirred for 42 hours at a temperature between 120° and 125° C. The mixture is cooled, filtered, and the filtrate so obtained is poured into 400 parts of a saturated aqueous solution of sodium chloride. The dyestuff which is precipitated is then filtered off, washed with a 5% aqueous solution of sodium chloride and dried.

When applied to wool from a neutral or slightly acid dyebath, the dyestuff yields violet shades possessing excellent fastness to light and to wet treatments.

The following table gives further examples of the new dyestuffs of the invention which are obtained by replacing the 3.98 parts of the monoazo compound used in Example 2 by an equivalent amount of the monoazo compound which is obtained by diazotising the amine listed in the second column of the table and coupling with the coupling component listed in the third column of the table. The fourth column of the table indicates the shades obtained when the dyestuffs are applied to wool, from a neutral or slightly acid-dyebath or from a dyebath the pH of which is originally less than 7 and the pH of which is raised during the dyeing process by the addition of an alkali or alkaline salt.

| Example | Amine | Coupling Component | Shade on wool |
| --- | --- | --- | --- |
| 3 | 2-amino-4 (3' hydroxy prop 1':2'-enylsulphonyl)-anisole. | 3:4 dimethyl phenol | Brown. |
| 4 | ----do---- | 1-phenyl-3-methyl-5-pyrazolone. | Reddish yellow. |
| 5 | ----do---- | 1-[4'-(3''-hydroxyprop-1'':2''-enylslphonyl)phenyl]-3-methyl-5-pyrazolone. | Orange. |
| 6 | ----do---- | 1-[4'-(3''-chloroprop-1'':2''-enylsulphonyl)-phenyl]-3-methyl-5-pyrazolone. | Do. |
| 7 | ----do---- | 2:4-dihydroxyquinoline. | Red. |
| 8 | ----do---- | 1-carboethoxyamino-7-naphthol. | Grey. |
| 9 | ----do---- | 2-naphthylamine. | Do. |

Example 10

A mixture of 5.39 parts of the monoazo compound obtained by coupling diazotised anthranilic acid-4-sulphonamide with 1-[4'-(3''-chloroprop-1'':2''-enylsulphonyl)phenyl]-3-methyl-5-pyrazolone in alkaline medium, 2.11 parts of chromium acetate, 80 parts of ethanol and 100 parts of water is stirred at the boil under a reflux condenser for 4 hours. The mixture is cooled, filtered and the filtrate so obtained is poured into 500 parts of a saturated aqueous solution of sodium chloride. The dyestuff which is precipitated is filtered off, washed with a 5% aqueous solution of sodium chloride and dried.

On analysis the dyestuff is found to contain 1.9 atoms of organically bound chlorine per molecule of dyestuff. When applied to wool from a neutral or slightly acid dyebath, the dyestuff yields reddish-yellow shades possessing excellent fastness to light and to wet treatments.

The following table gives further examples of the new dyestuffs of the invention which are obtained when the 5.39 parts of the monoazo compound used in Example 10 is replaced by an equivalent amount of the monoazo compound which is obtained by diazotising the amine listed in the second column of the table and coupling with the coupling component listed in the third column of the table. The fourth column of the table indicates the shades obtained on wool.

| Example | Amine | Coupling Component | Shade on wool |
| --- | --- | --- | --- |
| 11 | 6-nitro-2-aminophenol-4-sulphonamide. | 6-(3'-hydroxyprop-1':2'-enylsulphonyl)-2-naphthol. | Violet. |
| 12 | 4-nitroanthranilic acid | ----do---- | Reddish-brown. |

Example 13

A mixture of 4.48 parts of the monoazo compound obtained by coupling diazotised 4-chloro-2-aminophenol with 1-[4'-(3''-hydroxyprop-1'':2''-enylsulphonyl)phenyl]-3-methyl-5-pyrazolone in alkaline medium; 2.11 parts of chromium acetate, 90 parts of β-ethoxyethanol and 100 parts of water are stirred at the boil under a reflux condenser for 8 hours. The mixture is cooled, filtered and the filtrate so obtained poured into 400 parts of a saturated aqueous solution of sodium chloride. The dyestuff which is precipitated is then filtered off, washed with a 5% aqueous solution of sodium chloride and dried.

When applied to wool from a neutral or slightly acid dyebath the dyestuff yields red shades possessing excellent fastness to wet treatments and to light.

Example 14

A mixture of 4.96 parts of the monoazo compound obtained by coupling diazotised 2-aminophenol-4-sulphonamide with 4-(3'-hydroxyprop-1':2'-enylsulphonyl)-acetoacetanilide in alkaline medium, 1.75 parts of cobalt acetate, 80 parts of ethanol and 100 parts of water is stirred at the boil under a reflux condenser for 1 hour. The mixture is cooled, filtered, and the filtrate so obtained is poured into 300 parts of a saturated aqueous solution of sodium chloride. The dyestuff which is precipitated is filtered off, washed with a 5% aqueous solution of sodium chloride and dried.

When applied to wool from a neutral or slightly acid dyebath, the dyestuff yields yellow shades possessing excellent fastness to light and to wet treatments.

The following table gives further examples of the new dyestuffs of the invention which are obtained when the 4.96 parts of the monoazo compound used in Example 14 are replaced by an equivalent amount of the monoazo compound which is obtained by diazotising the amine listed in the second column of the table and coupling with the coupling component listed in the third column of the table. The fourth column of the table indicates the shades obtained on wool.

| Example | Amine | Coupling Component | Shade on wool |
| --- | --- | --- | --- |
| 15 | 4-nitro-2-aminophenol | 1-[4'-(3''-chloroprop-1'':2''-enylsulphonyl)-phenyl]-3-methyl-5-pyrazolone. | Reddish-yellow. |
| 16 | 4-methyl-2-aminophenol. | 1-[4'-(3''-hydroxyprop-1'':2''-enylsulphonyl)phenyl]-3-methyl-4-pyrazolone. | Orange. |
| 17 | 6-nitro-1-diazo-2-oxide naphthalene-4-sulphonamide. | ----do---- | Red. |

Example 18

A mixture of 4.63 parts of the monoazo compound obtained by coupling diazotised 2-aminophenol-4-sulphonamide with 6-(3'-hydroxyprop-1':2'-enylsulphonyl)-2-naphthol in alkaline medium, 1.75 parts of cobalt acetate, 80 parts of ethanol and 100 parts of water is stirred for ¼ hour at a temperature of 40° C. The mixture is then allowed to cool to room temperature, and the mixture is poured into 400 parts of a saturated aqueous solution of sodium chloride. The dyestuff which is precipitated is then filtered off, washed with a 5% aqueous solution of sodium chloride and dried.

When applied to wool from a neutral or slightly acid dyebath, the dyestuff yields bordeaux shades possessing excellent fastness to light and to wet treatments.

Example 19

In place of the 4.63 parts of monoazo compound used in Example 18 there are used 4.92 parts of the monoazo compound obtained by coupling diazotised 2-aminophenol-4-methylsulphone with 1-[4'-(3''-hydroxyprop-1'':2''-enylsulphonyl)phenyl]-3-methyl-5-pyrazolone in alkaline medium.

When applied to wool from a neutral or slightly acid dyebath, the dyestuff yields reddish-yellow shades possessing excellent fastness to light and to wet treatments.

The 6-(3'-hydroxyprop-1':2'-enylsulphinyl)-2-napthol used in the above examples was obtained as follows:

A mixture of 190 parts of the sodium salt of 2-acetylaminonaphthalene-7-sulphinic acid, 79 parts of epichlorohydrin and 1250 parts of water was stirred for 44 hours at a temperature of 22° C. and the precipitated 2-acetylamino-6-(3'-hydroxyprop-1':2'-enylsulphonyl)naphthalene was then filtered off, washed with water and dried.

A mixture of 12 parts of the 2-acetylamine-6-(3'-hydroxyprop-1":2"-enylsulphonyl)naphthalene, 52 parts of water and 20.8 parts of a concentrated aqueous solution of hydrochloric acid was stirred at the boil under a reflux condenser for 1 hour. The resulting solution was then cooled to 0° C. and 3 parts of sodium nitrite and 50 parts of ice were then added. Sulphamic acid was added to remove excess nitrous acid and the mixture so obtained was added, during 10 minutes, to 100 parts of a 20% aqueous solution of sulphuric acid at a temperature of 95° C. The resulting mixture was then stirred for 10 minutes at 100° C., cooled and the precipitated product filtered off, washed with water and dried. 6-(3'-hydroxyprop-1':2'-enylsulphonyl)-2-naphthol crystallised from ethanol in the form of a pink powder which melted at 233° to 237° C.

The 4-(3'-hydroxyprop-1':2'-enylsulphonyl)acetoacetanilide used in the above examples was obtained as follows:

A mixture of 19.9 parts of 4-acetylaminobenzene sulphinic acid, 4.6 parts of sodium hydroxide, 11.2 parts of epichlorohydrin and 130 parts of water was stirred for 48 hours at a temperature of 20° C. The precipitated 4-(3'-hydroxyprop 1':2'-enylsulphonyl)acetanilide was then filtered off, washed with water and dried.

A mixture of 60 parts of 4-(3'-hydroxyprop-1':2'-enylsulphonyl)acetanilide and 500 parts of a 2 N aqueous solution of sulphuric acid was stirred for 1 hour at a temperature between 95° and 100° C. The mixture was then filtered, the filtrate cooled to 20° C. and sodium bicarbonate added until the mixture was neutral to litmus. The precipitated 4-(3'-1':2'-enylsulphonyl)aniline was then filtered off, washed with water and dried.

A solution of 22.8 parts of 4-(3'-hydroxyprop-1:2'-enylsulphonyl)aniline in acetone at a temperature of 50° C. was added, during 3 hours, to a stirred mixture of 50 parts of a N/10 aqueous solution of hydrochloric acid, 200 parts of water, 0.5 part of a dispersing agent and 50 parts of diketene at a temperature between 15° and 20° C., and the resulting mixture was then stirred for 24 hours at the same temperature. The mixture was then distilled in a vacuum to remove the acetone, and the yellow oil which separated out was extracted with butanol. The butanol extracts were then dried and the butanol removed by distillation in vacuum. The residual 4-(3'-hydroxyprop-1':2'-enylsulphonyl)acetoacetanilide was obtained in the form of a hydroscopic yellow powder.

The 1-[4'-(3" - hydroxyprop - 1":2" - enylsulphonyl)phenyl]-3-methyl-5-pyrazolone used in the above examples was obtained as follows:

21 parts of sodium nitrite were added with stirring to a mixture of 68.4 parts of 4-(3'-hydroxyprop-1':2'-enylsulphonyl)aniline, 64 parts of a concentrated aqueous solution of hydrochloric acid and 150 parts of water, the temperature of the mixture being maintained between 0° and 5° C. by external cooling. 40 parts of sodium acetate crystals were then added and the resulting mixture was added, during 20 minutes, to a mixture of 252 parts of a 37% aqueous solution of sodium bisulphite and 22 parts of a 40% aqueous solution of sodium hydroxide, the temperature being maintained between 0° and 5° C. by the addition of ice. The mixture was stirred for 2 hours at this temperature and then for 2 hours at a temperature of 75° C. 125 parts of a concentrated aqueous solution of hydrochloric acid were then added and the mixture was stirred for 2½ hours at 95° C. The mixture was then cooled, filtered, and the filtrate was stirred at 30° C. A 30% excess of an aqueous solution of acetoacetamide was added and the mixture stirred for 1 hour at 30° C., then for 12 hours at 20° C. The precipitated pyrazolone was then filtered off, washed with water and dried. The pyrazolone melted at 253° to 259° C.

The 1-[4'-(3" - chloroprop - 1":2" - enylsulphonyl)phenyl] - 3 - methyl - 5 - pyrazolone used in the above examples was obtained by the method described above for the preparation of 1-[4'-(3"-hydroxyprop-1":2"-enylsulphonyl)phenyl]-3-methyl-5-pyrazolone except that the 68.4 parts of 4-(3'-hydroxyprop-1':2'-enylsulphonyl)aniline were replaced by 74.1 parts of 4-(3'-chloroprop-1':2'-enylsulphonyl)aniline, which was itself obtained by treating 4-(3'-hydroxyprop-1':2'-enylsulphonyl)acetanilide with thionyl chloride in the presence of pyridine and subsequently hydrolysing off the N-acetyl group.

What we claim is:

1. Metallised azo dyestuffs which are represented by the formula:

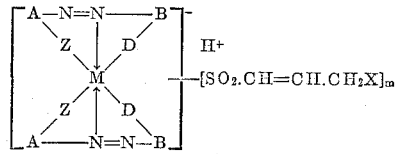

wherein A represents an arylene radical selected from the class consisting of phenylene and naphthylene arylene radicals; and any substituents on the said arylene radical are selected from the class consisting of nitro, sulphamyl, chloro, methyl, and methylsulphone; B represents the residue of an azo coupling component which couples in one of the ortho and vicinal positions to D, and selected from the class consisting of residues of coupling components of the phenol, naphthol, acetoacetanilide, 5-pyrazolone, 2:4-dihydroxyquinoline, and 2-naphthylamine coupling components; Z represents a bridging member selected from the class consisting of —O— and —COO—; D represents a bridging member selected from the class consisting of —O— and —NH—; and M represents a metal atom selected from the class consisting of chromium and cobalt atoms; $m$ represents one of the numbers 2 and 4; and X represents a member selected from the class consisting of a halogen atom and a hydroxy group; provided that A and B are free from sulphonic and carboxylic acid groups.

2. The 1:2 cobalt complex of the azo dyestuff having the formula:

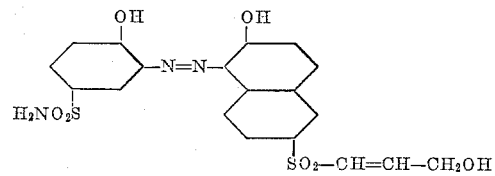

References Cited in the file of this patent

Wegmann, "Textil-Praxis," October 1958, pages 1056–1058.